United States Patent
Kormann

(10) Patent No.: US 9,301,447 B2
(45) Date of Patent: Apr. 5, 2016

(54) CONTROL ARRANGEMENT FOR CONTROLLING THE TRANSFER OF AGRICULTURAL CROP FROM A HARVESTING MACHINE TO A TRANSPORT VEHICLE

(71) Applicant: DEERE & COMPANY, Moline, IL (US)

(72) Inventor: Georg Kormann, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/195,215

(22) Filed: Mar. 3, 2014

(65) Prior Publication Data

US 2014/0193234 A1    Jul. 10, 2014

Related U.S. Application Data

(63) Continuation of application No. 12/992,951, filed as application No. PCT/EP2009/055762 on May 13, 2009, now Pat. No. 8,781,692.

(30) Foreign Application Priority Data

May 27, 2008 (DE) ............................ 200810002006

(51) Int. Cl.
    *G06F 7/70* (2006.01)
    *G06F 19/00* (2011.01)
    *G06G 7/00* (2006.01)
    *G06G 7/76* (2006.01)
    *A01D 43/073* (2006.01)
    *A01D 43/08* (2006.01)

(52) U.S. Cl.
    CPC ............ *A01D 43/073* (2013.01); *A01D 43/087* (2013.01)

(58) Field of Classification Search
    USPC .................. 701/50; 460/6; 348/86, 61, 143; 56/10.2 R, 153
    See application file for complete search history.

(56) References Cited

U.S. PATENT DOCUMENTS

| 7,211,745 | B1 * | 5/2007  | Brown et al. ................. 177/1 |
| 7,761,334 | B2 * | 7/2010  | Pickett et al. ................ 705/23 |
| 9,155,247 | B1 * | 10/2015 | Force .................. A01D 34/008 |
| 2002/0083695 | A1 | 7/2002 | Behnke et al. |
| 2003/0174207 | A1 | 9/2003 | Alexia et al. |
| 2003/0217539 | A1 | 11/2003 | Grossjohann et al. |
| 2003/0226341 | A1 * | 12/2003 | De Groen et al. ......... 56/10.2 R |
| 2006/0271555 | A1 * | 11/2006 | Beck et al. .................. 707/10 |
| 2009/0071714 | A1 | 3/2009 | Shrestha |
| 2009/0099775 | A1 * | 4/2009 | Mott et al. .................. 701/300 |
| 2009/0258684 | A1 * | 10/2009 | Missotten et al. ............. 460/5 |
| 2011/0061762 | A1 * | 3/2011 | Madsen .............. A01D 43/087 141/1 |

(Continued)

FOREIGN PATENT DOCUMENTS

| DE | 4403893 | 8/1995 |
| EP | 0070015 | 1/1983 |

(Continued)

*Primary Examiner* — Ronnie Mancho

(57) ABSTRACT

A control arrangement and method for controlling the transfer of agricultural crop from a harvesting machine to a transport vehicle comprises a loading container. The control arrangement is able to be operated to automatically deposit the crop during the harvesting mode successively at different points in the loading container, following a predetermined loading strategy, by means of a discharging device of the harvesting machine, where the loading strategy may be changed and/or a choice may be made between different loading strategies.

13 Claims, 4 Drawing Sheets

(56) References Cited

U.S. PATENT DOCUMENTS

| | | | |
|---|---|---|---|
| 2011/0066337 A1* | 3/2011 | Kormann | A01D 43/087 701/50 |
| 2011/0092726 A1* | 4/2011 | Clarke | C12M 21/02 554/175 |
| 2012/0029732 A1* | 2/2012 | Meyer | A01B 69/008 701/2 |
| 2014/0325422 A1* | 10/2014 | Madsen | A01D 43/087 715/771 |

FOREIGN PATENT DOCUMENTS

| | | |
|---|---|---|
| EP | 1219153 | 2/2006 |
| EP | 1645178 | 4/2006 |

* cited by examiner

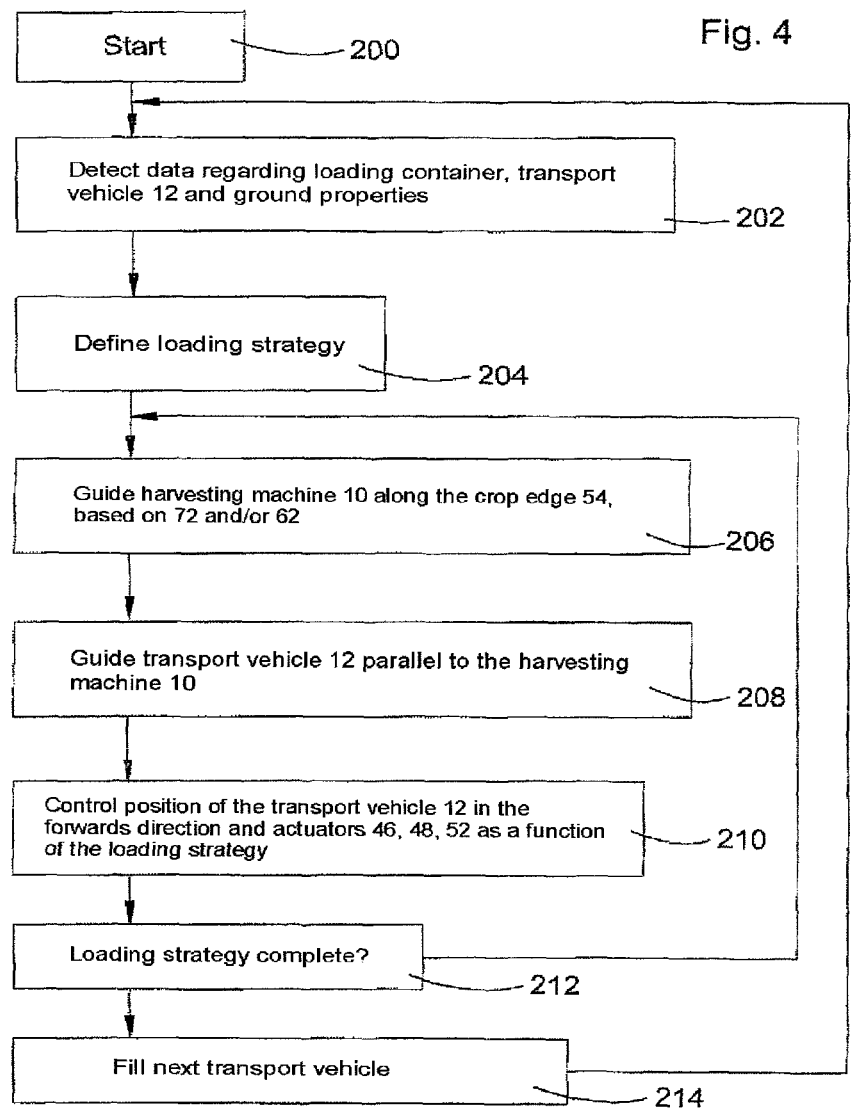

CONTROL ARRANGEMENT FOR CONTROLLING THE TRANSFER OF AGRICULTURAL CROP FROM A HARVESTING MACHINE TO A TRANSPORT VEHICLE

RELATED APPLICATIONS

This application is a continuation of U.S. patent application Ser. No. 12/992,951, filed on Nov. 16, 2010, which was the national phase of International Patent Application PCT/EP2009/055762, published as Publication No. WO 2009/144138, which is incorporated by reference herein.

FIELD OF THE INVENTION

The invention relates to a control arrangement for controlling the transfer of agricultural crop from a harvesting machine to a transport vehicle.

BACKGROUND ART

When harvesting agricultural crop on a field it is established practice that a harvesting machine loads a transport vehicle, which moves alongside the harvesting machine, with harvested crop. A loading container of the transport vehicle which is, for example, a tractor with a trailer or a truck, when travelling is loaded with the harvested crop by means of a discharging device of the harvesting machine, for example in a forage harvester via a discharge shaft and in a combine harvester via an ejection duct. The discharging device is generally fastened rotatably to the harvesting machine about a vertical axis and is pivotable between a resting position in which it is oriented approximately parallel to the longitudinal axis of the harvesting machine and an operating position in which it extends transversely to the direction of travel of the harvesting machine. Additionally, the height of the end of the discharging device on the discharge side may be varied, as may be the position of an ejection flap which defines the angle at which the harvested crop is discharged.

In discharging devices which may not be adjusted in their discharge position, as used conventionally in combine harvesters, the driver of the transport vehicle has to ensure that the loading container is filled uniformly and fully by gradually positioning different points of the loading container below the discharging device. This task is relatively demanding and tiring as losses of harvested crop due to harvested crop falling onto the field have to be avoided.

With adjustable discharging devices, as used conventionally in forage harvesters, in the simplest case the position of the discharging device is manually controlled by the driver of the harvesting machine, for which input devices are available to the driver in the cab, which activate actuators used for adjusting the discharging device. In this connection, the driver of the harvesting machine has to ensure that the entire loading container of the transport vehicle is sufficiently filled, which is carried out by successively aligning the discharging device with different points on the loading container. Should the transport vehicle deviate from its desired position forward or backward or to the side, the position of the discharging device has to be manually readjusted. In this connection, it may be regarded as a drawback that the control of the position of the discharging device takes up a considerable portion of the attention of the driver which results in tiring work for the driver of the harvesting machine.

Published German patent application, DE 44 03 893 A1 discloses a forage harvester comprising a discharging device, at the ends thereof on the discharge side a distance meter being attached, which detects the level of the harvested crop in the loading container. As soon as the harvested crop has reached a predetermined level, the discharging device is adjusted until the entire loading container is filled. In this case, the process is automated which substantially relieves the burden on the driver of the harvesting machine but which requires a costly distance meter.

In European patent application EP 1 219 153 A, it has been proposed to move the loading container automatically or manually relative to the harvesting machine into a position in which it may be filled. In fixed discharging devices (combine harvesters), information about the position of the discharging device is transmitted by means of a remote data transmission device to the transport vehicle and the position of the transport vehicle adapted, whilst movable discharging devices (forage harvesters), based on data regarding the position of the loading container and its own position, are automatically moved into a position in which they fill the loading container. If the driver identifies that a region of the loading container has been sufficiently loaded with harvested crop, and now a different region has to be filled, the position of the discharging device is manually altered by the driver of the harvesting machine. If the range of movement of the discharging device is no longer sufficient in order to reach insufficiently filled regions of the loading container, the relative position of the transport vehicle to the harvesting machine is automatically altered, which may also take place in the opposing direction to the discharging device.

Accordingly, the discharging device is automatically aligned continuously with a specific position on the loading container. The driver of the harvesting machine is, however, not relieved of the task of monitoring the cone of bulk material of the harvested crop collecting on the loading container and, if required, moving the discharging device into a new position.

European patent application EP 1 645 178 A proposes to guide the discharging device of a forage harvester along a defined geometry, which may be a straight line or curved path extending in the central longitudinal direction of the loading container. Also in this case, the position of the discharging device is changed by an input from the operator. Relative to the disclosure of EP 1 219 153 A the operator is merely relieved of the choice of a new position of the discharging device.

In the publications "Assistenzsystem zur Überladung landwirtschaftlicher Güter" ("Assistance System for transferring Agricultural Crops") by G. Wallmann and H. H. Harms, Landtechnik 2002, pages 352 and 353, and "Häckselgut automatisch Überladen" ("Automatic Transfer of Chopped Material") by A. Böhrnsen, Profi November 2006, pages 84 to 86, it is proposed to implement a loading strategy by means of the discharging device which effects a uniform and complete loading of the transport trailer by an alignment with different target areas in a clocked manner. To this end, the discharging device and its ejection flap may be guided in a zig-zag pattern, or alternatively only the ejection flap is continuously pivoted to and fro, whilst the transport vehicle is gradually moved further forward or backward by its driver. In this case, monitoring of the loading container is no longer required by the driver, as the control of the discharging device is carried out fully automatically. However, it is not taken into account by the set loading strategy that the most appropriate filling method in each case may also depend on the type of transport vehicle. Thus trucks with driven rear axles initially have to be loaded above the rear axle, whilst in contrast semitrailers have to be initially loaded in the front region of the trailer in order to ensure the traction capacity. In the prior art, the type of terrain is also not considered which may also have an effect on the best loading strategy in each case where there are lateral inclinations or inclinations present in the direction of travel.

SUMMARY

A control arrangement and method for controlling the transfer of agricultural crop from a harvesting machine to a transport vehicle comprises a loading container. The control arrangement is able to be operated to automatically deposit the crop during the harvesting mode successively at different points in the loading container, following a predetermined loading strategy, by means of a discharging device of the harvesting machine, where the loading strategy may be changed and/or a choice may be made between different loading strategies.

BRIEF DESCRIPTION OF THE DRAWINGS

FIG. 4 shows a flow diagram according to which the control unit of the harvesting machine operates.

DETAILED DESCRIPTION OF THE PREFERRED EMBODIMENT(S)

Figure 1:
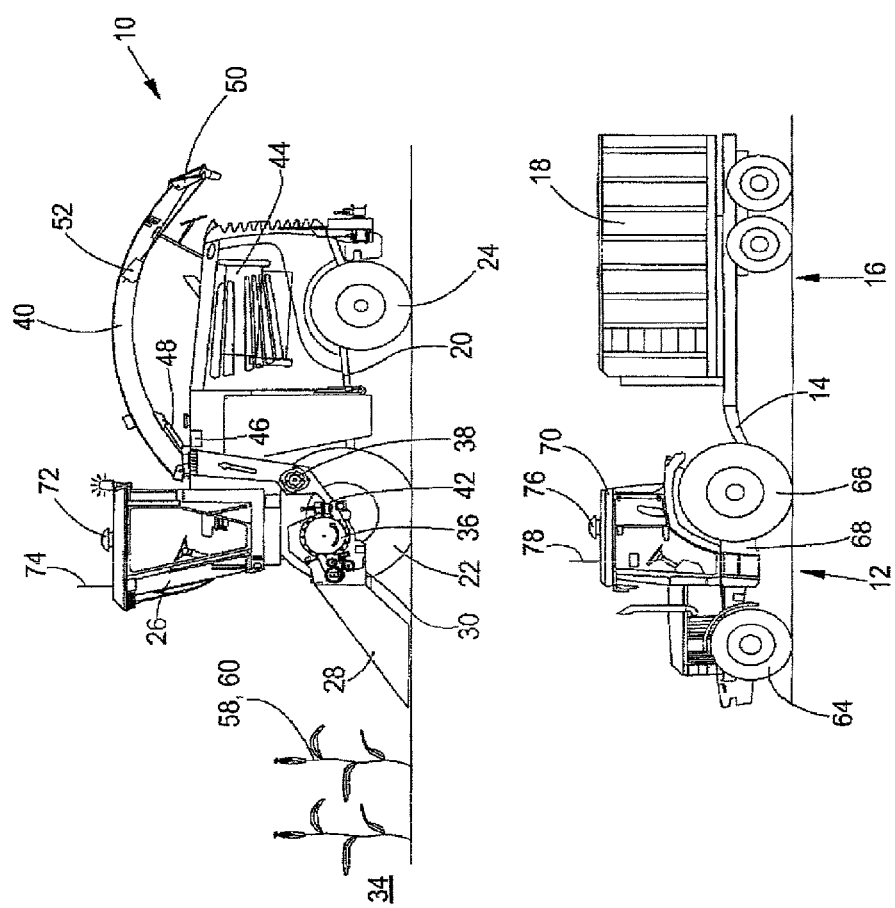
FIG. 1 shows a side view of a self-propelled harvesting machine and a transport vehicle.

In accordance with one embodiment, the control arrangement provides for control of the transfer of agricultural crop from a harvesting machine to a transport vehicle comprising a loading container, where the control arrangement may be flexibly adapted to the type of transport vehicle and/or the respective operating conditions.

A control arrangement serves for controlling the transfer of agricultural crop from a discharging device of a self-propelled or attached or pulled harvesting machine to the loading container of a transport vehicle. During the harvesting operation, the control arrangement influences the position of the discharge end of the discharging device and/or the direction of ejection of the discharging device and/or the position of the transport vehicle relative to the harvesting machine. The latter takes place by said control device transmitting steering and/or speed signals to a steering and/or speed setting device of the transport vehicle or a suitable display on the transport vehicle or the harvesting machine, using which the driver of the transport vehicle steers said transport vehicle and/or controls the speed thereof. Thus the harvested crop is automatically deposited by the control arrangement according to a predetermined loading strategy, which is stored in a storage device, successively at different points of the loading container. The loading strategy is able to be changed and/or a choice is able to be made between different loading strategies.

In this manner, the loading strategy may be adapted in an improved or optimized manner to the respective circumstances of the filling process. A detection of the level of the harvested crop on the loading container is not necessary, although it might be possible in principle.

The loading strategy may be selected depending on the type of transport vehicle, in order to load, for example, the trailer of a semitrailer initially in the front region, where the driven axles are located, whilst a truck with a driven rear axle is loaded initially in the region above the rear axle. In a similar manner, in a tractive machine with two trailers, initially the front trailer is loaded.

Moreover, the loading strategy may take into account the maximum load of the transport vehicle, in order to prevent overload. The maximum load (and thus the transfer time associated with the individual points of the loading container and the quantity of harvested crop deposited thereon after completing the loading of the loading container) may depend on factors, in particular dimensions of the transport vehicle and/or statutory requirements. Also, the potential weight distribution on the transport vehicle may be taken into account, so that if required more harvested crop may be deposited in the vicinity of the axles than in other regions of the loading container. Moreover, the loading strategy may depend on the ground conditions of the terrain which is driven on, for example on the traction capacity and/or load-bearing capacity of the ground. As a result, the wheels of the transport vehicle may be prevented from spinning or sinking into the ground when under too great a load. The ground conditions may be stored in a suitable electronic card accessible to the control device and may be retrieved by means of a position determining device (for example a GPS antenna).

The information used by the control device regarding the properties of the transport vehicle (for example the type of transport vehicle such as a semitrailer or truck or tractive machine and the number of trailers pulled, the position of the driven axle or axles, the dimensions of the loading container, the maximum load, the potential weight distribution, the traction capacity on different surfaces) may in a simple embodiment of the invention be supplied to the control device by the operator by means of an input device. The corresponding data are typed in or set via input keys or selected from menus. In a further embodiment, the information is transmitted by suitable storage means and transmitting devices from the transport vehicle to the harvesting machine. To this end, data may be transmitted by radio or optically, or the transport vehicle has a barcode, a transponder chip or an RFID chip, which may be read by the control arrangement. Based on this information, the control arrangement alters or selects the most suitable loading strategy in each case or modifies it.

The loading strategy may further depend on the inclination of the terrain in the direction of travel of the harvesting machine and/or in the lateral direction. The inclination is detected by means of an inclination sensor located on-board the harvesting machine and/or read from a card using the respective position and direction of travel of the harvesting machine detected by a position determining device. The loading strategy will ensure that the discharging device fills up the regions of the loading container which are respectively located uphill to a greater extent than its regions located downhill, in order to prevent harvested crop from falling to the ground. If the harvesting process takes place according to a path plan which is planned in advance, the inclination to be expected during the path to be covered is already known, so that the loading strategy may be adapted in advance to the anticipated inclination.

A combination of two agricultural machines shown in FIG. 1 comprises a harvesting machine 10 in the manner of a self-propelled forage harvester and a transport vehicle 12 in the manner of a self-propelled tractor which, by means of a towbar 14, pulls a trailer 16 which comprises a loading container 18.

The harvesting machine 10 is built on a frame 20 which is carried by the front driven wheels 22 and steerable rear wheels 24. The harvesting machine 10 is operated from a driver's cab 26 from which a harvesting attachment 28 in the form of a maize threshing attachment is visible, which is fastened to an inlet channel 30 on the front face of the forage harvester 10. By means of the harvesting attachment 28, harvested crop picked up from a field 34 is conveyed via an inlet conveyor, arranged in the inlet channel 30 and comprising pre-compacting rollers of a chopping drum 36, which chops the crop into small pieces and supplies it to a blower 38. Between the chopping drum 36 and the blower 38 extends a fine crushing device 42 comprising two grain processing rollers. The aforementioned driveable units of the harvesting machine 10 and of the harvesting attachment 28 are driven by means of an internal combustion engine 44. The crop discharged by the blower 38 leaves the harvesting machine 10 in the direction of the loading container 18 driven alongside via a discharging device 40 in the form of an ejector pipe, which may be rotated by means of a first, external force-actuated actuator 46 about an approximately vertical axis and which may be adjusted in inclination by means of a second external force-actuated actuator 48, the direction of ejection being able to be altered by a flap 50, and the inclination thereof being able to be adjusted by means of a third external force-actuated actuator 52.

The transport vehicle 12 and the trailer 16 are of conventional design. The transport vehicle 12 comprises front steerable wheels 64 and rear driven wheels 66, which are supported on a frame 68 which carries a driver's cab 70.

Figure 2:
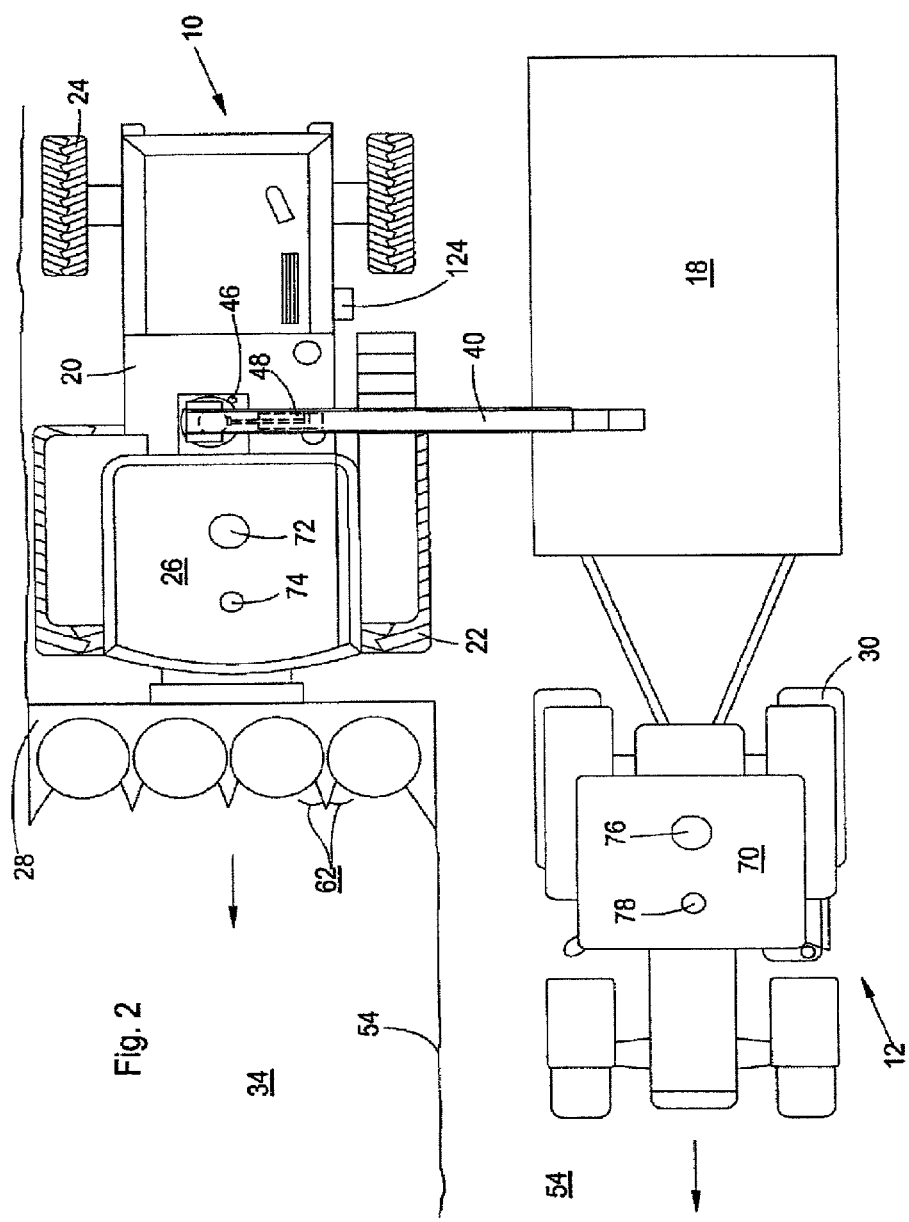
FIG. 2 shows a plan view of the harvesting machine and the transport vehicle, which together carry out a harvesting and transferring process on a field.

In FIG. 2, the harvesting machine 10 and the transport vehicle 12 are shown in plan view. It may be seen that the harvesting machine 10 moves along the edge of the harvested crop 54, which represents a boundary between the harvested region 56 of the field 34 and the plant population 60 of the field 34 which is still upright and full of maize plants 58, and which harvests the plants 58. The transport vehicle 12 drives on the harvested part 56 of the field parallel to the harvesting machine 10 along a path on which the plants chopped by the harvesting machine 10 pass through the discharging device 40 into the loading container 18. The transport vehicle 12, therefore, always has to drive parallel alongside the harvesting machine 10; in particular when driving into the field, however, the transport vehicle 12 may also drive behind the harvesting machine 10 as no harvested part 56 of the field 34 is present on which the transport vehicle 12 could drive without damaging the plants located there.

The harvesting machine 10 is steered by a driver sitting in the driver's cab 18 or by an automatically operating steering device known per se. The transport vehicle 12 is also provided with a steering device described in more detail hereinafter, in order to simplify and/or automate travelling parallel with the harvesting machine 10. The harvesting machine 10 could also be any other self-propelled harvesting machine, such as a combine harvester or beet harvester.

The harvesting machine 10 is provided with a first position determining device 72, which is located on the roof of the cab 26. Here a first radio antenna 74 is also positioned. The transport vehicle 12 is provided with a second position determining device 76, which is located on the roof of the cab 70. Here a second radio antenna 78 is also positioned.

Figure 3:
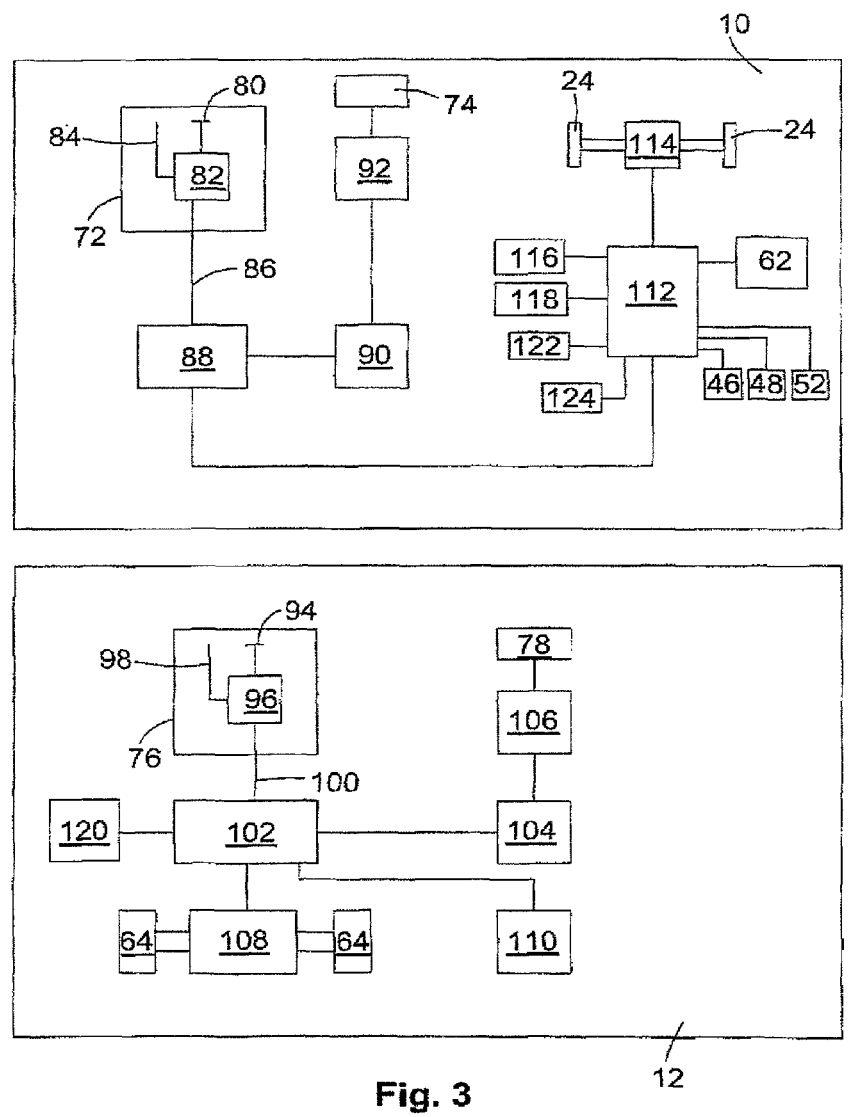
FIG. 3 shows a block diagram of the position determining devices of the two vehicles, as well as the elements cooperating therewith.

Reference is now made to FIG. 3, in which the individual components of the position determining devices 72, 76, and the steering devices of the transport vehicle 12 and of the harvesting machine 10 are shown schematically. The first position determining device 76 is located on-board the harvesting machine 10, said first position determining device comprising an antenna 80 and an evaluation circuit 82 connected to the antenna 80. The antenna 80 receives signals from satellites of a position determining system, such as GPS, Galileo or Glonass which are supplied to the evaluation circuit 82. Using the signals of the satellites, the evaluation circuit 82 determines the current position of the antenna 80. The evaluation circuit 82 is further connected to a correction data receiving antenna 84, which receives radio waves emitted from reference stations at known locations. Using the radio waves, correction data for improving the accuracy of the position determining device 72 is produced by the evaluation circuit 82.

The evaluation circuit 82 transmits via a bus line 86 its positional data to a computing device 88. The computing device 88 is connected via an interface 90 to a receiving and transmitting device 92, which in turn is connected to the radio antenna 74. The receiving and transmitting device 92 receives and generates radio waves which are received and/or emitted by the antenna 74.

Similarly, the second position determining device 76 is located on-board the transport vehicle 12, said second position determining device comprising an antenna 94 and an evaluation circuit 96 connected to the antenna 94. The antenna 94 receives signals from satellites of the same position determining system as the antenna 80, which are supplied to the evaluation circuit 96. Using the signals of the satellites, the evaluation circuit 96 determines the current position of the antenna 94. The evaluation circuit 96 is further connected to a correction data receiving antenna 98, which receives radio waves emitted from reference stations at known locations. Using the radio waves, correction data is generated by the evaluation circuit 96 for improving the accuracy of the position determining device 76.

The evaluation circuit 96 transmits via a bus line 100 its positional data to a computing device 102. The computing device 102 is connected via an interface 104 to a receiving and transmitting device 106, which in turn is connected to the radio antenna 78. The receiving and transmitting device 106 receives and generates radio waves which are received and/or emitted by the antenna 78. By means of the receiving and transmitting devices 90, 106 and the radio antennae 74, 78 data may be transmitted from the computing device 88 to the computing device 102 and vice versa. The connection between the radio antennae 74, 78 may be direct, for example provided in an authorized radio range such as CB-radio, amongst other things, or via one or more relay stations, for example when the receiving and transmitting devices 90, 106 and the radio antennae 74, 78 operate according to the GSM standard or another appropriate standard for mobile telephones.

The computing device 102 is connected to a steering device 108, which controls the steering angle of the front steerable wheels 64. Moreover, the computing device 102 transmits speed signals to a speed setting device 110 which, by varying the engine speed of the transport vehicle 12 and/or the gear ratio, controls the speed of the transport vehicle 12. Moreover, the computing device 102 is connected to a permanent memory 120.

On-board the harvesting machine 10 the computing device 88 is connected to a control unit 112, which together with the actuators controlled thereby and the sensors connected therewith forms a control arrangement for controlling the transfer of the harvested crop from the harvesting machine 10 onto the loading container 18 of the transport vehicle 12. The latter is connected to a steering device 114, which controls the steering angle of the rear, steerable wheels 24. Moreover, the control unit 112 transmits speed signals to a speed setting device 116 which, by varying the gear ratio, controls the speed of the transport vehicle 12. The control unit 112 is further connected to a throughput sensor 118 which detects the distance between the pre-compacting rollers in the inlet channel, comprising a sensor for detecting the position of sensing frames 62 attached to a divider point of the harvesting attachment 28, a permanent memory 122 and comprising the actuators 46, 48 and 50.

In FIG. 4 a flow diagram is shown, according to which the control unit 112 of the harvesting machine 10 operates during the harvesting operation.

After the start in step 200, step 202 follows, in which the control unit 112 causes the computing device 88 to request the contents of the memory 120 from the computing device 102. Data is contained therein, for example regarding the engine output of the transport vehicle 12, its type (in this case: tractive machine and/or tractor) and the tires (width, diameter, profile size). Moreover, by means of the input from an operator into an input device the computing device 102 obtains data regarding the dimensions of the loading container and the load bearing capacity of the trailer 16. This data could also be contained in the memory 120, or such data are stored in the memory 122 for different trailers 16, and may be selected by the driver of the harvesting machine 10 or by means of a barcode reader 124 which detects suitable markings on the trailer 16 or on the outer wall of the loading container 18. The barcode reader 124 could also be replaced by an RFID chip or transponder chip reader (not shown), which may read RFID chips or transponder chips attached to the trailer 16 or to the loading container 18. These chips contain the aforementioned data regarding the dimensions of the loading container 18 and the load bearing capacity of the trailer 16 or (similar to the barcode) only identification data, from which the aforementioned data may be read from the memory 122. Moreover, the control unit 112 also obtains data regarding the ground conditions. In this connection it is the lateral inclination and the inclination of the ground in the forward direction and data regarding the traction properties of the ground (for example whether it is loose sandy ground or relatively solid ground or damp ground). This data regarding the ground conditions is read from a card stored in the memory 122 using a path planned for the next harvesting process, stored in the memory 122.

In the following step 204, the loading strategy is determined, using which the loading container 128 is to be filled. The loading strategy defines the positions and the associated time periods in which the discharging device 40 will unload the harvested crop. Thus the horizontal and vertical dimensions of the loading container 18 and its load bearing capacity are taken into account, the density of the harvested crop being able to be derived from empirical values or being able to be measured by suitable sensors. Moreover, the type of transport vehicle 12 is taken into account. In the case shown here, the loading of the loading container 18 is initially carried out in its front region, in order to ensure a sufficient loading of the rear driven wheels 66 of the transport vehicle 12 via the towbar 14. A truck with a driven rear axle and loading container (not shown) arranged thereabove would, however, initially be filled in the rear region. The engine output of the transport vehicle 12, the data regarding the tires and the traction properties of the ground influence the intended filling level of the harvested crop in the loading container 18, in order to avoid the wheels 66 sinking into the ground or spinning in unfavorable conditions. The inclination of the ground also influences the loading strategy, in order to fill the side of the loading container 18 located uphill in each case to a higher level than the side located downhill. The data required in step 204 was supplied in step 202 to the control unit 112. The loading strategy may provide that the loading container 18 is filled according to defined patterns, which are covered once or repeatedly. Examples of such patterns are strips extending in the forward direction along the middle of the loading container or zig-zag patterns extending from front to back. However, any other patterns are conceivable. In a possible embodiment of the present invention, two different basic loading strategies are stored, of which one starts with the loading of the loading container 18 at the front and the other at the back, and which are selected using the type of transport vehicle and/or the position of its driven wheels. The other aforementioned data thus serves to adapt the selected loading strategy to the respective operating conditions.

After the loading strategy in step 204 has been determined and stored in the memory 122, step 206 follows in which the harvesting machine 10 is steered along the edge of the harvested crop 54, by the control unit 112 providing steering signals to the steering device 114, which are based on the signals from the position determining device 72 and a card stored in the memory 122, which defines a path planned for the next harvesting process, or based on signals from the sensing frames 62 or a combination of both signals. Alternatively or additionally, the edge of the harvested crop 54 is detected by a two-dimensional or three-dimensional camera and an image processing system or a laser or ultrasound sensor or scanner and used for producing the steering signal for the steering device 114. The path of the harvesting machine 10 does not necessarily have to run dead straight, but may also include curves depending on the shape of the field. Moreover, turning procedures at the end of the field are provided.

The speed of advance of the harvesting machine 10 may be predetermined by its driver, or the control unit 112 uses the throughput signals of the throughput sensor 118 in order to control the speed setting device 116 so that a desired throughput is achieved through the harvesting machine 10.

Moreover, in step 208, the transport vehicle 12 is guided parallel to the harvesting machine 10, by the control unit 112 transmitting to the computing device 102, via the computing device 88 and the radio antennae 74, 78, data regarding the position to be controlled by the transport vehicle 10. The computing device 102 then controls the steering device 108 and the speed setting device 110 accordingly, by comparing the position detected by the position determining device 76 with the position to be controlled and, depending on the result of the comparison, emits suitable steering signals to the steering device 108. This comparison and the generation of the steering signal for the steering device 108 could also be carried out by the computing device 88 and/or the control unit 112 on-board the harvesting machine 10, the positional data being transmitted from the position determining device 76 of the transport vehicle via the radio antennae 74, 78 to the harvesting machine 10, whilst the steering signals are transmitted back in the reverse direction to the transport vehicle 12. The transport vehicle 12 follows the harvesting machine 10 even when driving around curves and when turning at the end of the field.

In step 210 the actuators 46, 48 and 52 are activated for adjusting the position of the discharge end of the discharging device 40 and the direction of ejection according to the loading strategy planned in step 204, so that the loading container 18 is gradually filled in the planned manner. Additionally or alternatively, the position of the transport vehicle 12 varies in the forward direction and/or in the lateral direction relative to the harvesting machine 10, by the control unit 112 transmitting to the computing device 102, via the computing device 88 and the radio antennae 74, 78, corresponding data regarding the position to be controlled by the transport vehicle 10. As a result, the path of the harvested crop between the discharge end of the discharging device 40 and the loading container 18 may be kept relatively short, which has the advantages that in windy conditions little harvested crop is lost and the harvested crop is pre-compressed on the loading container 18.

Step 212 then follows, in which it is queried whether the loading strategy has been completely carried out. If this is not the case, step 206 follows again. Otherwise, step 214 follows. As the loading strategy has been fulfilled, in this step an information device (not shown) operated optically or acoustically by the control unit 112 via the computing devices 88, 102, causes the driver of the transport vehicle 12 to undertake control of the transport vehicle 12 and to clear space in the vicinity of the harvesting machine 10, in order to create space for a transport vehicle which follows. Alternatively, the steering unit 108 of the transport vehicle 12 is activated to move the transport vehicle forward to the side, whereupon the driver of the transport vehicle 12 takes control. The transport vehicle 12 which follows is positioned by its driver alongside the harvesting machine 10 and step 202 again follows. If this step 202 has to be repeated for the same transport vehicle 12, the control unit 112 may also refer back to the already previously stored loading strategy.

It should be noted that in a simplified embodiment of the invention the driver of the harvesting machine 10 steers said machine and predetermines its speed, whilst the driver of the transport vehicle 12 steers said vehicle and predetermines its speed. The control unit 112 then only controls the actuators 46, 48 and 52 according to a loading strategy selected manually by the driver of the harvesting machine from at least two available loading strategies, and which preferably depends on the position of the driven wheels of the transport vehicle 12, as mentioned above. These loading strategies may be modified by the driver of the harvesting machine 10 manually according to the size of the loading container 18, for example by the discharging device 40 being initially positioned on the front and rear wall of the loading container 18.

I claim:

1. A control arrangement for controlling the transfer of agricultural crop from a harvesting machine to a transport vehicle comprising:
   a loading container;
   a discharging device of the harvesting machine;
   an actuator operably connected between a portion of the harvesting machine and the discharging device;
   a control unit for controlling the actuator to automatically deposit the crop during the harvesting mode successively at different points in the loading container, following a predetermined loading strategy, by the control unit influencing a position of a discharge end of the discharging device of the harvesting machine, wherein the loading strategy may be changed and a choice may be made between different loading strategies
   wherein a barcode or a transmitter or a transponder chip or radio frequency identification (RFID) chip is attached to the transport vehicle, which may be received or read by the control unit on the harvesting machine and based on read information that comprises dimensions of the loading container, the control arrangement alters or selects the most suitable loading strategy, wherein the different loading strategies may comprise filling the loading container according to defined patterns,
   wherein the defined patterns comprise strips extending in the forward direction along the middle of the loading container or zig-zag patterns extending from front to back.

2. The control arrangement as claimed in claim 1, wherein the loading strategy is able to be selected depending on the type of transport vehicle.

3. The control arrangement as claimed in claim 2, wherein the loading strategy is able to be selected depending on the position of the driven wheels of the transport vehicle.

4. The control arrangement as claimed in claim 3, wherein the loading strategy provides that the loading container is initially filled above the respective driven wheels of the transport vehicle.

5. The control arrangement as claimed in claim 1, wherein the loading strategy takes into account a maximum load or a potential weight distribution of the transport vehicle.

6. The control arrangement as claimed in claim 5, wherein the maximum load or the potential weight distribution of the transport vehicle depends on at least one of properties of the transport vehicle, statutory requirements, or ground conditions of the terrain which is driven on.

7. The control arrangement as claimed in claim 6, wherein the control arrangement may be operated to extract the ground conditions from a card using a position determining device.

8. The control arrangement as claimed in claim 1 wherein the loading strategy may be altered and may be selected by the input from an operator or automatic detection of information regarding the transport vehicle.

9. The control arrangement as claimed in claim 8, wherein the automatic detection of information regarding the transport vehicle takes place via electromagnetic waves.

10. The control arrangement as claimed in claim 1, wherein the loading strategy takes into account the inclination of the terrain.

11. The control arrangement as claimed in claim 10, wherein the inclination of the terrain may be detected by an inclination sensor attached to the harvesting machine and using a card and a position determining device.

12. The control arrangement as claimed in claim 1, wherein the control arrangement may be operated to alter: (a) the position of the discharge end of the discharging device relative to the harvesting machine or a direction of ejection of the discharging device (b) a vehicle position of the transport vehicle relative to the harvesting machine.

13. A method for transferring agricultural crop from a harvesting machine to a transport vehicle comprising:
    automatically depositing, by the harvesting machine, a harvested crop during a harvesting mode successively at different points in a loading container under a predetermined loading strategy;
    following a predetermined loading strategy, by a control unit influencing a position of a discharge end of discharging device of the harvesting machine wherein the predetermined loading strategy may be changed and a choice may be made between different loading strategies;
    wherein a barcode or a transmitter or a transponder chip or radio frequency identification (RFID) chip is attached to the transport vehicle, which may be received or read by the control unit on the harvesting machine and based on read information that comprises dimensions of the loading container, the control arrangement alters or selects the most suitable loading strategy, wherein the different loading strategies may comprise filling the loading container according to defined patterns,
    wherein the defined patterns comprise strips extending in the forward direction along the middle of the loading container or zig-zag patterns extending from front to back.

* * * * *